United States Patent
Koppers et al.

(10) Patent No.: US 10,066,831 B2
(45) Date of Patent: Sep. 4, 2018

(54) AIR DISTRIBUTION NOZZLE AND A FLUIDIZED BED REACTOR

(71) Applicant: Doosan Lentjes GmbH, Ratingen (DE)

(72) Inventors: Thorsten Friedrich Koppers, Goch (DE); Oguzhan Narin, Sprockhovel (DE)

(73) Assignee: Doosan Lentjes GmbH, Ratingen (DE)

( * ) Notice: Subject to any disclaimer, the term of this patent is extended or adjusted under 35 U.S.C. 154(b) by 239 days.

(21) Appl. No.: 15/029,747

(22) PCT Filed: Oct. 9, 2014

(86) PCT No.: PCT/EP2014/071668
§ 371 (c)(1),
(2) Date: Apr. 15, 2016

(87) PCT Pub. No.: WO2015/086191
PCT Pub. Date: Jun. 18, 2015

(65) Prior Publication Data
US 2016/0281977 A1 Sep. 29, 2016

(30) Foreign Application Priority Data
Dec. 11, 2013 (EP) .................................. 13196697

(51) Int. Cl.
*F23C 10/20* (2006.01)
*B01J 8/18* (2006.01)
(Continued)

(52) U.S. Cl.
CPC ............ *F23C 10/20* (2013.01); *B01J 8/1818* (2013.01); *B01J 8/44* (2013.01); *F27B 15/02* (2013.01); *F27B 15/10* (2013.01)

(58) Field of Classification Search
CPC ........... F23C 10/20; F27B 15/02; F27B 15/10
See application file for complete search history.

(56) References Cited

U.S. PATENT DOCUMENTS

| 3,298,793 | A | * | 1/1967 | Mallison | ............... B01J 8/1818 208/163 |
|---|---|---|---|---|---|
| 4,460,330 | A | * | 7/1984 | Asai | ...................... B01J 8/1827 110/263 |

(Continued)

FOREIGN PATENT DOCUMENTS

| DE | 94 03 330 U1 | 4/1994 | ............ F23D 14/64 |
|---|---|---|---|
| DE | 9403330 U1 | 4/1994 | |

(Continued)

OTHER PUBLICATIONS

International Search Report from corresponding International Patent Application No. PCT/EP2014/071668, dated Jan. 22, 2015.

*Primary Examiner* — Nathaniel Herzfeld
(74) *Attorney, Agent, or Firm* — Kusner & Jaffe

(57) ABSTRACT

An air distribution nozzle and fluidized bed including said nozzle, the nozzle including a gas inlet pipe and an air distribution cap defining a space inbetween them, first air outlet means allowing air to flow from the gas inlet pipe to the space and second outlet means allowing air to flow from said space to the ambient area, wherein said second outlet means has an outer cross section along the outer surface of the cap that varies in its vertical height along its horizontal extension.

23 Claims, 1 Drawing Sheet

(51) Int. Cl.
*F27B 15/10* (2006.01)
*B01J 8/44* (2006.01)
*F27B 15/02* (2006.01)

(56) References Cited

U.S. PATENT DOCUMENTS

| | | | | |
|---|---|---|---|---|
| 4,574,496 | A * | 3/1986 | Sedlacek | B05B 1/265 |
| | | | | 110/245 |
| 4,589,841 | A * | 5/1986 | Bergkvist | B01J 8/1818 |
| | | | | 122/4 D |
| 4,779,547 | A * | 10/1988 | Zugner | B01J 8/1818 |
| | | | | 110/297 |
| 4,841,884 | A * | 6/1989 | Engstrom | B01J 8/44 |
| | | | | 110/245 |
| 6,099,301 | A * | 8/2000 | Honkaniemi | C03B 3/023 |
| | | | | 110/245 |
| 2008/0127868 | A1* | 6/2008 | Seminatore | F23C 10/20 |
| | | | | 110/245 |
| 2012/0138698 | A1 | 6/2012 | Wilson et al. | 239/1 |
| 2012/0214109 | A1* | 8/2012 | Begina | F23C 10/20 |
| | | | | 431/170 |
| 2013/0318816 | A1* | 12/2013 | Thaler | B01J 8/1818 |
| | | | | 34/487 |

FOREIGN PATENT DOCUMENTS

| | | | | |
|---|---|---|---|---|
| DE | 102 27 473 A1 | 1/2004 | | F23C 10/20 |
| EP | 1 850 067 A2 | 10/2007 | | F23D 14/22 |
| EP | 2 522 903 A2 | 11/2012 | | F23C 10/20 |
| WO | WO 2012/122490 A2 | 9/2012 | | F23D 14/22 |

* cited by examiner

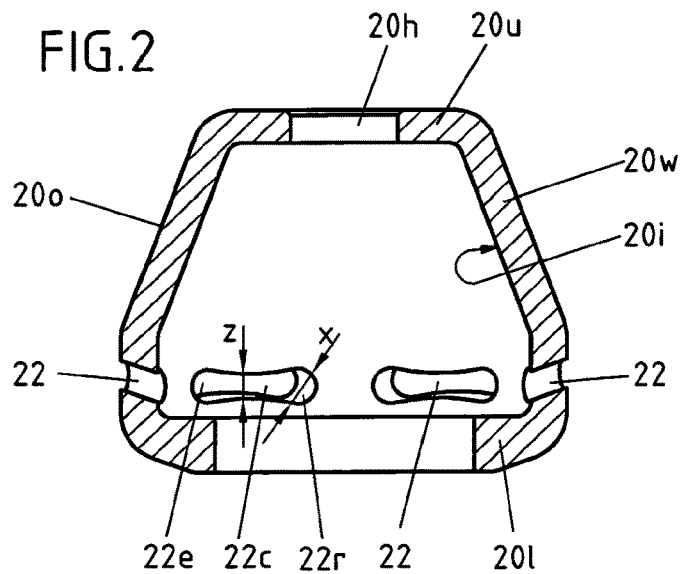
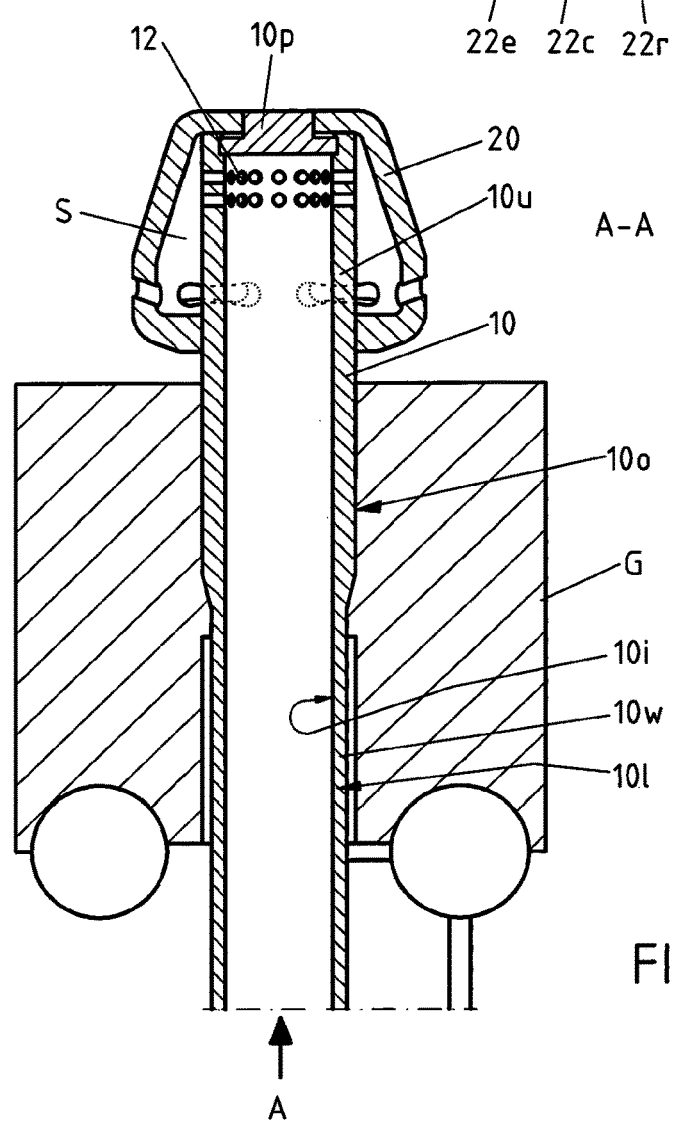

AIR DISTRIBUTION NOZZLE AND A FLUIDIZED BED REACTOR

FIELD OF THE INVENTION

The invention relates to an air distribution nozzle as used—inter alia—in a fluidized bed reactor.

BACKGROUND OF THE INVENTION

Prior art and the invention will be described hereinafter referring to the use of such a nozzle in a fluidized bed reactor of a generic type, thereby referring to the typical mounting position of such a nozzle in a fluidized bed of a fluidized bed reactor, i.e. with a substantially vertical orientation and an air outflow opening at the upper end section of said nozzle.

Usually fluidized bed reactors are in the form of combustors, boilers, gasifiers etc. They comprise a grid (also called a grate or a perforated plate) supporting a bed of particulate material, including a fuel material like coal, sand and ash. Air is introduced into said bed by means of nozzles. As a result of said air which is fed into and passing the bed the bed receives a fluid like state. The grid typically comprises openings to remove excessive material out of the reaction chamber.

Various types of air distribution nozzles are known in prior art. One type of those known nozzles is characterized by the following features in its functional position:
a gas inlet pipe, having
  an inner surface, an outer surface, a lower end section adapted to receive air from an associated air source, and an upper end section,
an air distribution cap, having
  an upper boundary, fixed to the upper end section of the gas inlet pipe,
  a lower bottom, arranged at a vertical distance below said upper boundary and surrounding the gas inlet pipe,
  a peripheral wall, having an inner surface and an outer surface and extending between said upper boundary and said lower bottom, thereby defining at least one space between corresponding sections of the outer surface of the gas inlet pipe and the inner surface of the wall of the air distributor cap,
first air outlet means allowing an air flow from the central gas inlet pipe into the space and
a plurality of second air outlet means allowing an air flow from said space into an ambient area,
first and second air outlet means are arranged vertically offset.

This design is similar to a mushroom with its shaft being the gas inlet pipe and its head presenting the air distribution cap. In other words:

Air is fed vertically upward through the gas inlet pipe, fed through the first air outlet means into the mostly annular space between gas inlet pipe and air distribution cap and further in a substantially horizontal direction through said second air outlet means and insofar through said cap wall into the surrounding area, for example into the fluidized bed of a fluidized bed reactor.

The second air outlet means (openings) are designed as through holes of circular cross section. This leads to a corresponding focused and defined air stream of high velocity into the associated fluidized bed.

Although these nozzles have been used to great extent there is a continuous demand for improvements. In this context it was asserted that the fluidized bed often contains larger particles formed during combustion and/or gasification, which particles cannot be fluidized and cannot move freely in the direction of the grid outlet openings. These larger solid particles may cause damage and wear to the grid and the nozzles; they further reduce the efficiency of the fluidized bed.

SUMMARY OF THE INVENTION

It is therefore an object of the invention to provide an air distribution nozzle with improved properties, especially with respect to optimization of the flow behavior of a fluidized bed within a fluidized bed reactor.

The invention is based on the following findings:

The focused and defined central air stream provided by prior art nozzles allows to inject a beam like air stream of high velocity into the fluidized bed but is limited to an air distribution over a restricted area only. This may cause inhomogeneities in the fluidized bed.

The invention differs from said prior art in providing second air outlet means of different square sections and shapes within one or more distinct opening(s).

This relates to the respective opening in total and especially includes designs characterized in that at least the outer cross section (being the cross section at the outer wall surface, i.e. the surface adjacent to the fluidized bed) of said second air outlet means is characterized by a restricted passage (a passage of reduced vertical height) between its end zones to the left and to the right.

In other words: prior art nozzles typically have air outlet openings of circular cross section. Although the vertical height of a circle varies between its right and left end, as is first increases until the maximum height is reached right in the middle before it decrease to zero again, these changes are continuous. Contrary to that the second air outlet means (air outlet opening) according the invention provide an irregular change of the vertical height along its horizontal extension, meaning that an increase in height is followed by a reduction of height before a further increase in height follows. These changes may be repeated in an alternating manner.

This includes the following shapes:
  two substantially circular openings of a maximum vertical diameter X with a slit or channel like opening in between with a vertical height of X-Y, wherein Y is larger than zero and typically ≥10%, ≥20%, ≥30%, ≥40%, ≥50% but ≤60% or ≤75% of X. The two circular openings and the intermediate slit together form one distinct/discrete air outlet means. The circular openings to the left and right provide the largest vertical height while the slit in between is of reduced height.
  two substantially oval openings of a maximum vertical diameter X with a slit or channel like opening in between with a vertical height of X-Y, wherein Y is larger than zero and typically ≥10%, ≥20%, ≥30%, ≥40%, ≥50% but ≤60% or ≤75% of X. The overall design is similar to that of the first example.

All these shapes allow the air, escaping from one opening, to flow into different directions with different speeds/velocities and in different volumes into the adjacent fluidized bed, thus causing a much better, as much more intensive air distribution within said fluidized bed.

These nozzles allow to control the pressure drop of the air flowing through the nozzle.

A multiplicity of said nozzles may be arranged in rows or in staggered arrangements along the grid in a fluidized bed arrangement.

The invention includes variations of this general technical teaching by one or more of the flowing features:

One nozzle may have a plurality of first air outlet means.
The first air outlet means may be provided vertically above the second air outlet means, this causes the air to meander within the nozzle before escaping through the second air outlet openings.

According to one embodiment the outer cross section of the at least one of said second air outlet means is defined by rounded end zones to the left and to the right. This leads to an improved air flow into the fluidized bed.

The outer cross section of the at least one of said second air outlet means may also be defined by semi-circular end zones to the left and to the right.

Another embodiment provides an outer cross section of the at least one of said second air outlet means which is defined by a restricted passage in the middle between its end zones to the left and to the right.

The restricted passage may be defined by a rounded profile at its upper and lower periphery (which corresponds to its horizontal extension).

In one further embodiment the outer cross section of the at least one of said second air outlet means is defined by a dog bone profile.

Another option is: The outer cross section of the at least one of said second air outlet means is defined by a maximum width to height ratio between 20:1 and 5:1 and/or the outer cross section of the at least one of said second air outlet means is defined by a minimum width to height ratio between 10:1 and 1:1.

In an embodiment where the at least one of said second air outlet means has a larger cross section along the inner surface of said wall than along the outer surface of said wall, the direction and/or velocity of the air stream may be further defined in the desired way to fit the local demands.

This includes embodiments wherein at least one of said second air outlet means provides a curved or sloped periphery between inner and outer surface of the wall.

Typically one nozzle or one air distribution cap respectively will be equipped with a plurality of second air outlet means distributed along the periphery of the said wall, for example at equal horizontal (peripheral) distances.

The invention further relates to a fluidized bed furnace/reactor including a plurality of air distribution nozzles of the type mentioned.

BRIEF DESCRIPTION OF THE DRAWINGS

The invention will now be described with reference to an embodiment as represented in the attached drawings showing in a schematic way FIG. 1: a vertical cross-sectional view of a nozzle according to the invention FIG. 2: an enlarged sectional view of the air distribution cap of the nozzle

DETAILED DESCRIPTION OF THE INVENTION

FIG. 1,2 disclose an air distribution nozzle with the following features in its functional position:
a gas inlet pipe 10, comprising
an inner surface 10*i*, an outer surface 10*o*, a lower end section 10*l* adapted to receive air from an associated air source (symbolized by arrow A), and an upper end section 10*u*,
an air distribution cap 20, comprising
an upper boundary 20*u*, fixed to the upper end section 10*u* of the gas inlet pipe 10. This fixation is achieved by a central hole 20*h* in the boundary 20*u*, set and welded onto a corresponding axial (vertical) protrusion 10*p* of air inlet pipe 10,
a lower bottom 20*l*, arranged at a vertical distance below said upper boundary 20*u* and surrounding the gas inlet pipe 10,
a peripheral wall 20*w*, having an inner surface 20*i* and an outer surface 20*o* and extending between said upper boundary 20*u* and said lower bottom 20*l*, thereby defining at least one space S between corresponding sections of the outer surface 10*o* of the gas inlet pipe 10 and the inner surface 20*i* of the wall 20*w* of the air distributor cap 20,
first air outlet means 12 in the upper end 10*u* of wall 10*w* of said air inlet pipe 10 allow an air flow from the central gas inlet pipe 10 into the space S and
a plurality of second air outlet means 22 (namely six, four of which can been seen in FIG. 1,2) allow an air flow from said space S into an ambient area AA,
first and second air outlet means 12, 22 are arranged vertically offset, namely first outlet means 12 are arranged vertically above said second air outlet means 22,
each of said second air outlet means 22 has an outer cross-section along the outer surface 20*o* of said wall 20*w* that varies in its vertical height along its horizontal extension (see especially FIG. 2).

The design of each of said second air outlet openings 22 may be described as follows:

It comprises two substantially circular openings 22*l*, 22*r* of a diameter X with a channel like opening 22*c* in between with a vertical height of Z. As may be seen from the Figures upper and lower rim (periphery) of said channel 22*c* are curved, namely convex to each other such that a minimum distance (height) between upper and lower rim is achieved substantially in the middle of said opening, seen in a horizontal direction. This design is similar to a dog bone with a zone of restricted height between two outer larger sections.

It is further important that the inner cross section of each of said second outlet openings 22 is of same shape but larger so that the air, flowing through said opening, is focused before leaving the air outlet opening 22.

In any case: The two circular openings 22*l*, 22*r* and the intermediate slit 22*c* together form one distinct air outlet means. The circular openings 22*l*, 22*r* to the left and right provide the largest vertical height (X) while the slit in between is of reduced height (varying between the two circular openings 22*l*, 22*r* with a minimum value of Z).

In the embodiment shown all openings 22 are arranged at the same vertical level and evenly distributed along the periphery of cap 20.

The specific design of this nozzle allows to optimize the air flow from the nozzle into an adjacent fluidized bed (AA) when said nozzle is arranged in a grid G of a fluidized bed reactor, as shown in FIG. 1

Having described the invention, the following is claimed:
1. A fluidized bed air distribution nozzle comprising:
a gas inlet pipe, having
an inner surface, an outer surface, a lower end section adapted to receive air from an associated air source, and an upper end section;
an air distribution cap, having an upper boundary, fixed to the upper end section of the gas inlet pipe, a lower bottom, arranged at a vertical distance below said upper boundary and surrounding the gas inlet pipe, and a peripheral wall, having an inner surface and an outer surface and extending between said upper boundary and said lower bottom, thereby defining at least one space between corresponding sections of the outer surface of the gas inlet pipe and the inner surface of the wall of the air distributor cap;

first air outlet means allowing an air flow from the central gas inlet pipe into the space; and a plurality of second air outlet means allowing an air flow from said space into an ambient area, wherein the first and second air outlet means are arranged vertically offset, and at least one of said second air outlet means has an outer cross-section along the outer surface of said wall that varies in its vertical height along its horizontal extension, said outer cross-section of the at least one of said second air outlet means defined by first and second end zone openings and a restricted intermediate channel of reduced vertical height located therebetween, and wherein the first and second end zone openings and the restricted intermediate channel together provide a continuous opening that forms a single distinct second air outlet means.

2. The fluidized bed air distribution nozzle according to claim 1, wherein the fluidized bed air distribution nozzle has a plurality of the first air outlet means.

3. The fluidized bed air distribution nozzle according to claim 1, wherein the first air outlet means are provided vertically above the plurality of second air outlet means.

4. The fluidized bed air distribution nozzle according to claim 1, wherein the first and second end zone openings are rounded.

5. The fluidized bed air distribution nozzle according to claim 1, wherein the first and second end zone openings are semi-circular.

6. The fluidized bed air distribution nozzle according to claim 1, wherein the restricted intermediate channel is defined by a rounded profile at an upper and a lower periphery of the restricted intermediate channel.

7. The fluidized bed air distribution nozzle according to claim 1, wherein the outer cross-section of the at least one of said second air outlet means is defined by a maximum width to height ratio between 20:1 and 1:1.

8. The fluidized bed air distribution nozzle according to claim 1, wherein the outer cross-section of the at least one of said second air outlet means is defined by a minimum width to height ratio between 10:1 and 5:1.

9. The fluidized bed air distribution nozzle according to claim 1, wherein at least one of said second air outlet means has a larger cross-section along the inner surface of said wall than along the outer surface of said wall.

10. The fluidized bed air distribution nozzle according to claim 9, wherein at least one of said second air outlet means provides a curved or sloped periphery between the inner and outer surface of the wall.

11. The fluidized bed air distribution nozzle according to claim 1, wherein the fluidized bed air distribution nozzle has a plurality of the second air outlet means distributed along a periphery of the said wall.

12. The fluidized bed air distribution nozzle according to claim 11, wherein each of the second air outlet means have the same shape.

13. A fluidized bed reactor comprising:
a plurality of fluidized bed air distribution nozzles, each air distribution nozzle including:
a gas inlet pipe, having
an inner surface, an outer surface, a lower end section adapted to receive air from an associated air source, and an upper end section;
an air distribution cap, having
an upper boundary, fixed to the upper end section of the gas inlet pipe,
a lower bottom, arranged at a vertical distance below said upper boundary and surrounding the gas inlet pipe, and
a peripheral wall, having an inner surface and an outer surface and extending between said upper boundary and said lower bottom, thereby defining at least one space between corresponding sections of the outer surface of the gas inlet pipe and the inner surface of the wall of the air distributor cap;
first air outlet means allowing an air flow from the central gas inlet pipe into the space; and
a plurality of second air outlet means allowing an air flow from said space into an ambient area,
wherein the first and second air outlet means are arranged vertically offset, and at least one of said second air outlet means has an outer cross-section along the outer surface of said wall that varies in its vertical height along its horizontal extension, said outer cross-section of the at least one of said second air outlet means defined by first and second end zone openings and a restricted intermediate channel of reduced vertical height located therebetween, and
wherein the first and second end zone openings and the restricted intermediate channel together provide a continuous opening that forms a single distinct second air outlet means.

14. The fluidized bed air distribution nozzle according to claim 1, wherein the restricted intermediate channel is defined by a curved upper peripheral rim and a curved lower peripheral rim.

15. The fluidized bed air distribution nozzle according to claim 14, wherein the curved upper peripheral rim and the curved lower peripheral rim are convex-shaped.

16. The fluidized bed air distribution nozzle according to claim 14, wherein the first and second end zone openings are substantially circular-shaped openings.

17. The fluidized bed air distribution nozzle according to claim 14, wherein the first and second end zone openings are substantially oval-shaped openings.

18. The fluidized bed air distribution nozzle according to claim 1, wherein
each of said first and second end zone openings have a maximum vertical diameter X;
said restricted intermediate channel has a vertical height of X-Y, where Y is larger than zero, and greater than or equal to 10% of X, but less than or equal to 75% of X; and
said first and second end zone openings provide the largest vertical height while the restricted intermediate channel provides a reduced vertical height relative to the first and second end zone openings.

19. The fluidized bed reactor according to claim 13, wherein the restricted intermediate channel is defined by a curved upper peripheral rim and a curved lower peripheral rim.

20. The fluidized bed reactor according to claim 19, wherein the curved upper peripheral rim and the curved lower peripheral rim are convex-shaped.

21. The fluidized bed reactor according to claim 19, wherein the first and second end zone openings are substantially circular-shaped openings.

22. The fluidized bed reactor according to claim 19, wherein the first and second end zone openings are substantially oval-shaped openings.

23. The fluidized bed reactor according to claim 13, wherein
- each of said first and second end zone openings have a maximum vertical diameter X;
- said restricted intermediate channel has a vertical height of X-Y, wherein Y is larger than zero, and greater than or equal to 10% of X, but less than or equal to 75% of X; and
- said first and second end zone openings provide the largest vertical height while the restricted intermediate channel provides a reduced vertical height relative to the first and second end zone openings.

* * * * *